No. 895,721.

PATENTED AUG. 11, 1908.

H. BROOME.
TENDER FOR CORN HARVESTERS.
APPLICATION FILED MAR. 30, 1907.

2 SHEETS—SHEET 1.

Witnesses
G. Howard Walmsley
Edward L. Reed

Inventor
Henry Broome,
By H. A. Toulmin,
Attorney

No. 895,721. PATENTED AUG. 11, 1908.
H. BROOME.
TENDER FOR CORN HARVESTERS.
APPLICATION FILED MAR. 30, 1907.
2 SHEETS—SHEET 2.
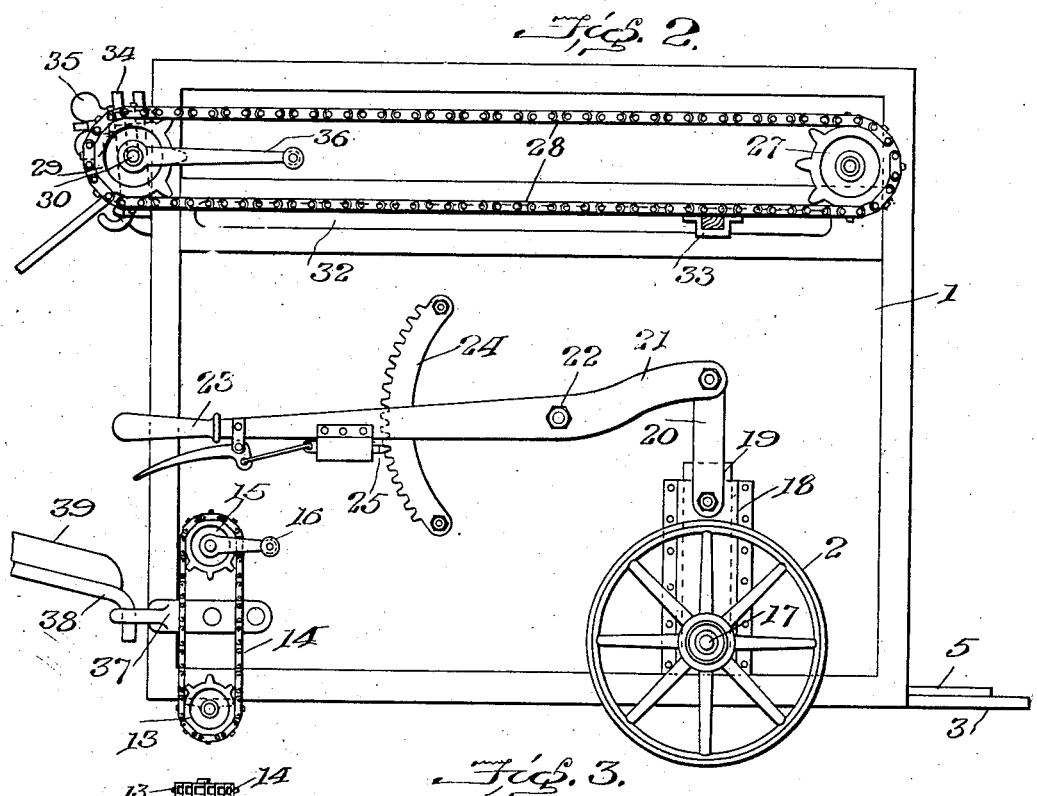
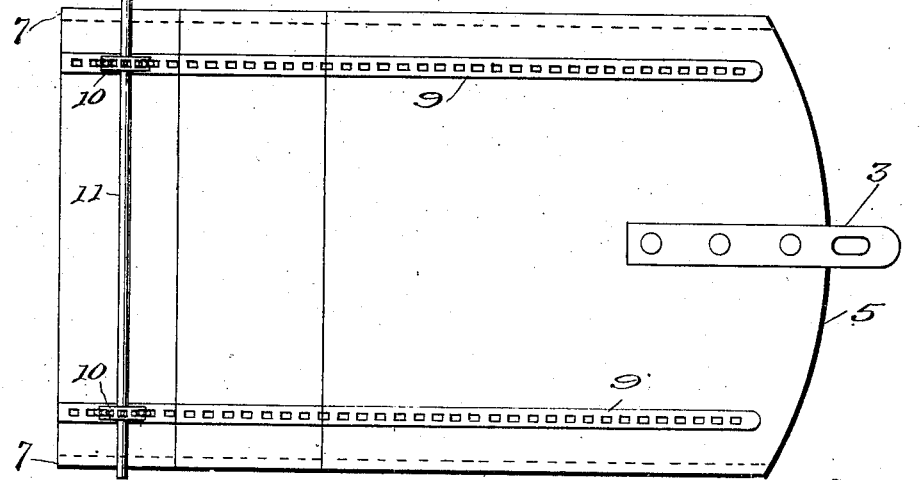
Inventor
Henry Broome,
Witnesses
G. Howard Walmsley,
Edward F. Reed
By H. A. Toulmin,
Attorney

UNITED STATES PATENT OFFICE.

HENRY BROOME, OF SPRINGFIELD, OHIO, ASSIGNOR OF ONE-THIRD TO WILLIAM DENNICK, OF DAYTON, OHIO, AND ONE-THIRD TO CLAUDE W. FLICK, OF SPRINGFIELD, OHIO.

TENDER FOR CORN-HARVESTERS.

No. 895,721.  Specification of Letters Patent.  Patented Aug. 11, 1908.

Application filed March 30, 1907. Serial No. 365,456.

*To all whom it may concern:*

Be it known that I, HENRY BROOME, a citizen of the United States, residing at Springfield, in the county of Clark and State of Ohio, have invented certain new and useful Improvements in Tenders for Corn-Harvesters, of which the following is a specification, reference being had therein to the accompanying drawings.

The present invention relates to tenders for corn harvesters, and the object of the same is to provide a tender of this character adapted to receive corn stalks in an upright position from the harvester and accumulate the same until a shock has been formed, and which can then be readily detached from the harvester and transported to any part of the field where it is desired to deposit the shock; and further, to provide an improved means for discharging the shock from the tender, comprising a removable bottom and means for lowering the tender to a position close to the ground; and further, to provide suitable means for supporting the corn stalks in an upright position as they accumulate in the tender.

With these objects in view, my invention consists of certain novel features of construction to be hereinafter described and then more fully pointed out in the claims.

Figure 1:
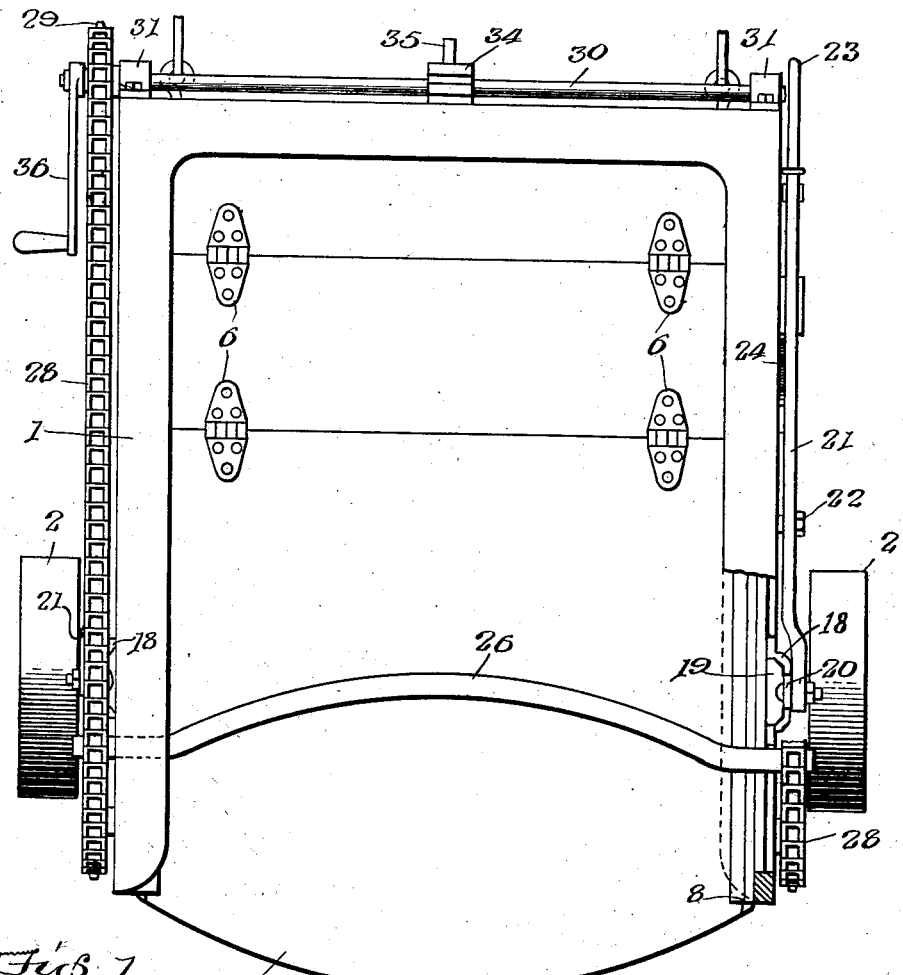
Figure 4:
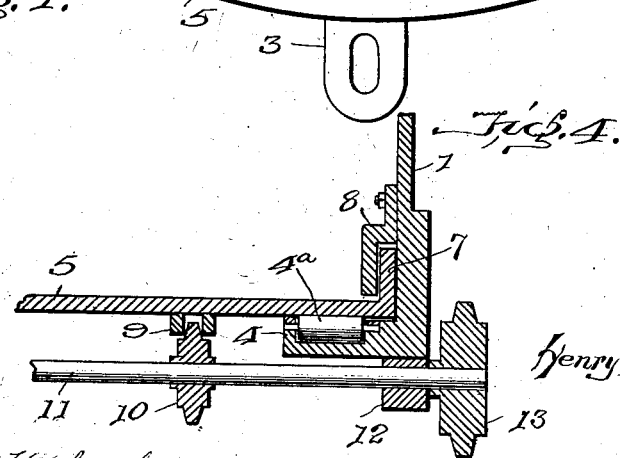

In the accompanying drawings, Figure 1 is a top plan view of a tender built in accordance with my invention. Fig. 2 is a side elevation of the same. Fig. 3 is a bottom plan view of the removable bottom. Fig. 4 is a detail sectional view of a portion of the bottom and the operating means therefor.

In these drawings I have shown the preferred embodiment of my invention, in which the reference numeral 1 indicates the body portion of the tender, which is mounted on suitable supports such as the ground wheels 2. This body portion is preferably substantially rectangular in shape, the sides being of sufficient height to support the corn stalks in an upright position, and is open at one end, where it is provided with suitable means for connecting the same to the rear of the harvester, such means being shown in the present instance as a slotted plate 3. The side walls of the body portion are provided at the lower edges with inwardly extending flanges 4, which may be of any suitable construction, but I preferably employ angle irons secured to the lower edges of the sides of the body portion in such a manner as to project inwardly from the edge thereof.

A suitable bottom 5, of a width corresponding substantially to the interior diameter of the body portion, is supported upon the flanges 4 and may be of any suitable construction, but I prefer to form the same of a series of sections as herein shown, the sections being connected by suitable hinges 6, and to provide the sections at the opposite sides thereof with upwardly extending projections or flanges 7, adapted to be engaged by clips or angle irons 8, which are secured to the inner walls of the sides of the body portion and extend over the flanges 7 and serve to secure the bottom against vertical or lateral movement, but allow the same a free movement longitudinally of the body portion. The bottom 5 may be supported upon the guide or flange 4 in any suitable manner, but I prefer to provide the flange with suitable rollers 4ª, which may be secured thereto in any suitable manner, thereby reducing the friction and allowing the bottom to move with much greater ease.

Suitable rack bars 9 are secured to the lower sides of the movable bottom near the opposite sides thereof, and preferably extend for substantially the full length of said bottom, being divided at the joints in said bottom in order that they may not interfere with the folding of the same. The rack bars 9 are adapted to be engaged by pinions 10, mounted upon a shaft 11, which is journaled in suitable bearings 12 on the lower portion of the side walls of the body portion, and is provided at its outer end with a sprocket wheel 13 which is connected by means of a sprocket chain 14 with a second sprocket wheel 15 which is secured to the side walls of the body portion in such a position that it can be conveniently operated and is provided with a suitable crank 16 for rotating the same.

In order that the tender may be easily transported from one point to another, it is desirable that the body portion should be supported a suitable distance above the ground, but when so supported the bottom is such a distance above the ground that the stalks fall unevenly and the shock is disarranged. In order to avoid this, I have provided the supporting wheels 2 with vertically adjustable axles 17. This I accomplish by providing on either side of the body portion 1 suitable guideways 18, which preferably consist of inwardly faced, recessed plates rigidly secured to the side walls. A suitable guide or slide bar is mounted in the guideway 18 and is secured at its lower end to the axle 17 and is connected at its upper end, by means of a link 20, with one end of a lever 21 which is pivoted to the body portion at 22. The lever 21 is provided at its other end with an operating handle 23, and with suitable means for retaining same in adjusted position, such as the usual toothed segment 24 and the spring-pressed pawl 25.

To retain the corn stalks in their upright position as they accumulate in the tender, I provide a transverse bar 26, which extends entirely across the body portion of the tender and is adapted to move longitudinally of the body portion when pressure is applied thereto, but is held against movement under the weight of the stalks. This may be accomplished in any suitable manner, but I prefer to provide the body portion 1 with sprocket wheels 27, journaled on opposite sides thereof and near the open end thereof, which are connected by means of sprocket chains 28 with the sprocket wheels 29 mounted on a suitable shaft 30 which is journaled in bearings 31 on the closed end of the body portion 1. A suitable slot 32 is formed in each side of the body portion 1 and extends substantially the full length thereof and near the upper edge of the sides thereof. The ends of the bar 26 extend through the slots 32 and engage the sockets or brackets 33 which are carried by the sprocket chain 28. A suitable brake is provided for the shaft 30 in order that the movement of the sprocket chain 28 may be regulated. This preferably consists of a split block 34 having a thumb screw 35 extending through both portions thereof above the shaft and adapted to compress the same upon the shaft and hold the shaft either against all movement or against movement until a certain pressure is applied thereto. The shaft 30 is provided with a suitable crank 36 for operating the same in reverse direction.

The tender is provided at the closed end thereof with a suitable draft hitch, which may be of any suitable character, that shown in the present instance consisting merely of eye-bars 37 which are engaged by hooks 38 on the thills 39.

The operation of the device is as follows: The tender is detachably connected with the rear of the harvester by any suitable means, and as the harvester moves through the field, the corn stalks are carried rearwardly in the harvester and deposited in the tender, the upper ends thereof coming in contact with the transverse bar 26, which, when the tender is empty, is near the open end thereof, are held in an upright position. The tension applied to the shaft 30 by the brake 34 is sufficient to hold the bar against movement under the weight of the stalks, but the pressure applied thereto by the stalks under the pressure of the conveyer on the harvester, is sufficient to move the bar towards the closed end of the tender. When the tender has been filled, the shock is bound and the tender disconnected from the harvester and an empty tender substituted therefor. A horse is then attached to the draft hitch and the tender transported to the desired locality and the lever 21 operated to lower the tender to a position close to the ground. The crank 16 is then operated and the shaft 11 and pinions 10 rotated to move the bottom 5 out from beneath the shock and allow the same to drop out of the tender upon the ground. As the bottom is moved out from under the body portion, the sections are folded one upon the other, thereby avoiding a long projecting part at the end of the tender and enabling the draft hitch to be made much shorter without the danger of the bottom coming in contact with the horse.

It will be seen that by making the bottom removable as distinguished from a movable bottom, I am enabled to deposit the shock directly upon the ground without imparting any horizontal movement to the same, as is necessary where the shock is moved out of the tender on a movable bottom, and I thereby avoid the disarrangement and loosening of the shock that have been incident to the former construction; and by making the body portion of the tender vertically adjustable I am enabled to deposit the shock on the ground with a very slight vertical movement, thus still further diminishing the disarrangement thereof.

I wish it to be understood that I do not desire to be limited to the exact details of construction shown and described, for obvious modifications may occur to a person skilled in the art.

Having fully described my invention, what I claim as new and desire to secure by Letters Patent is:

1. A device of the character described comprising a body portion having both sides and one of its ends closed and the other end open, means for connecting the open end of said body portion to the discharge end of a harvester, a normally stationary bottom slidably mounted in said body portion, means carried by said body portion for supporting the stalks in an upright position, and means for moving said bottom outwardly through the closed end of said body portion.

2. A device of the character described comprising a body portion having both of its sides and one end closed and the other end open, means for connecting the open end of said body portion to the discharge end of a harvester, a normally stationary bottom slidably mounted in said body portion, automatically receding means carried by said body portion for supporting the stalks in an upright position, and means for moving said bottom outwardly through the closed end of said body portion.

3. A device of the character described comprising a body portion having both sides and one end closed and the other end open, means for connecting the open end of said body portion to the discharge end of a harvester, a foldable bottom slidably mounted in said body portion, means carried by said body portion for supporting the stalks in an upright position, and means for moving said bottom outwardly through the closed end of said body portion.

4. A device of the character described comprising a body portion having both sides and one end closed and the other end open, means for connecting the open end of said body portion to the discharge end of a harvester, horizontal guides extending inwardly from the lower edges of said closed sides of said body portion, antifriction rollers carried by said guides, a bottom supported on said antifriction rollers having upwardly extending flanges at the opposite sides thereof, clips secured to the sides of said body portion and extending over said flanges and means for moving said bottom through the closed end of said body portion.

5. A device of the character described comprising a body portion having both sides and one end closed and the other end open, a normally stationary bottom slidably mounted in said body portion, means for connecting said bottom at the open end of said body portion to the discharge end of a harvester, means carried by said body portion for supporting the stalks in an upright position, and means for moving said bottom outwardly through the closed end of said body portion.

6. A device of the character described comprising a body portion having both sides and one end closed and the other end open, guides secured near the lower edges of the sides of said body portion, a bottom supported on said guides comprising a series of sections pivotally connected one to the other, rack bars secured to each of said sections and arranged in alinement one with the other, a pinion supported upon said body portion and adapted to engage said rack bars, and means for rotating said pinion to move said bottom outwardly through the closed end of said body portion.

7. A device of the character described comprising a body portion having both of its sides and one end closed and the other end open, means for connecting the open end thereof to the discharge end of a harvester, a bottom slidably mounted in said body portion, means located near the closed end of said body portion for actuating said bottom, a vertically adjustable support for said body portion, and means located adjacent to said bottom-actuating means for adjusting said support.

8. A device of the character described comprising a body portion having both of its sides and one end closed and the other end open, means for connecting the open end thereof to the discharge end of a harvester, a bottom slidably mounted in said body portion, a rack secured to the under surface of said body portion, a shaft mounted on said body portion, a pinion carried thereby adapted to engage said rack, a sprocket wheel mounted on the end of said shaft, a second sprocket wheel supported on said body portion above said first-mentioned sprocket wheel, a chain extending about said sprocket wheels, means for actuating said last-mentioned sprocket wheel, a vertically adjustable support for said body portion, a lever pivotally mounted on said body portion having one end connected to said adjustable support and the other end extending to a point adjacent to the upper sprocket wheel, and means for holding said lever in its adjusted position.

9. A device of the character described comprising a body portion having both sides and one end closed and the other end open, means for connecting the open end thereof to the discharge end of a harvester, a bottom slidably mounted in said body portion, means located near the closed end of said body portion for actuating said bottom, a vertically adjustable support for said body portion, means located near the closed end of said body portion for adjusting said support, automatically receding means carried by said body portion and adapted to support the stalks in upright position therein, and means located near the closed end of said body portion for moving said supporting mechanism in a reverse direction.

10. A device of the character described, comprising a body portion having a removable bottom and having slots formed in the opposite sides of said body portion, a bar extending across the same and through said slots, means for controlling the movement of said bar, and means for moving said bottom longitudinally of said body portion, substantially as described.

11. A device of the character described, comprising a body portion having a removable bottom and having slots formed in the sides thereof, a bar extending across said body portion and through said slots, guides secured at the opposite ends of said body portion, flexible members extending about said guides, means for securing the ends of said bar to said flexible members, means for controlling the movement of said flexible members, and means for moving said bottom longitudinally of said body portion, substantially as described.

12. A device of the character described comprising a body portion having a movable bottom, a bar extending across said body portion and projecting beyond the sides thereof, guides mounted on each side of said body portion near the opposite ends thereof, an endless belt extending about said guides and secured to said bar, means for controlling the movement of said endless belt, and means for moving said bottom to discharge the shock.

13. A device of the character described, comprising a body portion having longitudinal slots formed in the opposite walls thereof, a removable bottom for said body portion, means for moving said bottom longitudinally thereof, sprocket wheels journaled at one end of said body portion, a shaft journaled at the opposite end thereof, sprocket wheels carried by said shaft, a sprocket chain connecting said last mentioned sprocket wheels with said first mentioned sprocket wheels, a bar extending across said body portion through said slots and connected to said sprocket chain, and means for applying friction to said shaft, substantially as described.

14. A device of the character described, comprising a body portion having slots extending longitudinally thereof and a removable bottom therefor, means for moving said bottom longitudinally of said body portion, supporting wheels for said body portion, means for adjusting said body portion vertically of said wheels, a bar extending across said body portion and through said slots, and means for controlling the movement of said bar, substantially as described.

In testimony whereof I affix my signature in presence of two witnesses.

HENRY BROOME.

Witnesses:
A. C. LINK,
EDWARD T. REED.